J. T. CARITHERS.
TIRE.
APPLICATION FILED FEB. 21, 1908.
916,668.
Patented Mar. 30, 1909.
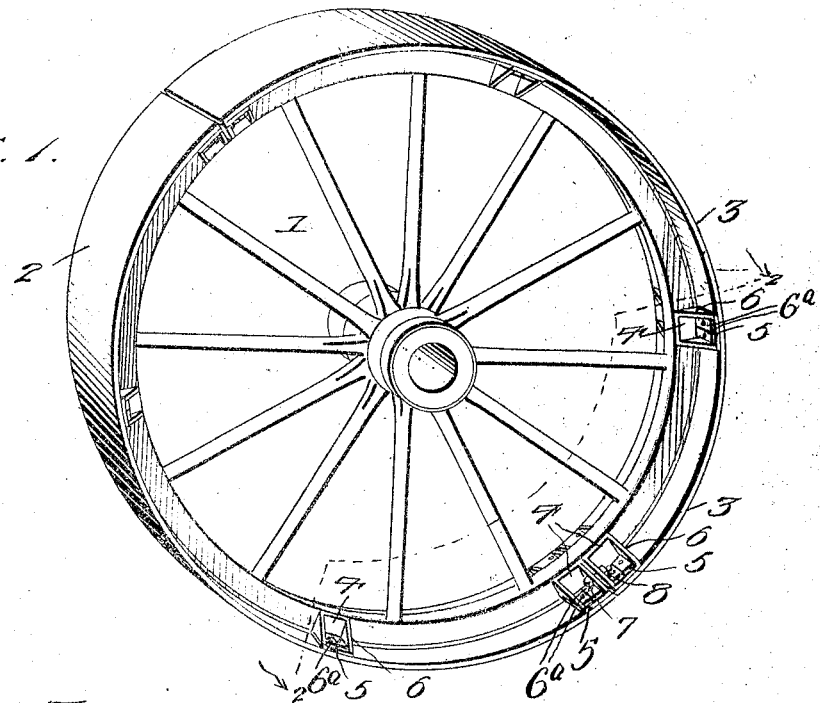
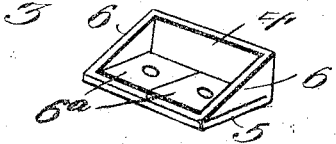
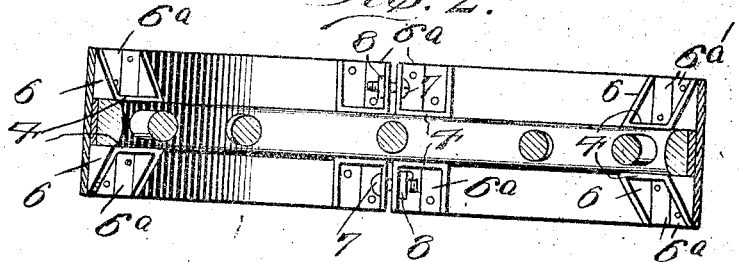
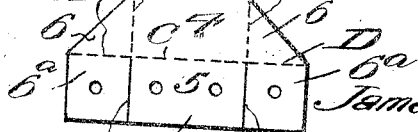
Witnesses
Inventor
James T. Carithers,
By Victor J. Evans
Attorney

UNITED STATES PATENT OFFICE.

JAMES T. CARITHERS, OF MORNING SUN, IOWA.

TIRE.

No. 916,668.　　　Specification of Letters Patent.　　Patented March 30, 1909.

Application filed February 21, 1908.　Serial No. 417,067.

*To all whom it may concern:*

Be it known that I, JAMES T. CARITHERS, a citizen of the United States, residing at Morning Sun, in the county of Louisa and State of Iowa, have invented new and useful Improvements in Tires, of which the following is a specification.

This invention relates to supplementary tires for vehicle wheels, and the object of the invention is to provide a supplementary tire whereby an ordinary vehicle wheel may be readily provided with a wide bearing face or tread, and which may be quickly and securely positioned upon the wheel, and readily detached therefrom when desired.

To these and other ends the invention resides in the novel construction and arrangement of parts hereinafter fully described and claimed.

In the drawing, Figure 1 is a perspective view of a vehicle wheel provided with the supplementary tire of my construction and having my improvements, and Fig. 2 is a sectional view on the line 2—2 of Fig. 1, looking in the direction of the arrows. Fig. 3 is a detail perspective view of one of the lugs. Fig. 4 is a view of the blank from which the lug is formed.

In the drawing the numeral 1 designates a vehicle wheel of the ordinary construction, and is shown as a means to illustrate the application of my invention.

The supplementary tire comprises a pair of segments 2 and 3, constructed preferably of flat metal of any required width and of the necessary length to encompass the wheel 1. Each of the segments 1 and 2 is provided with a plurality of retaining and bracing lugs, arranged in pairs and located at a distance from each other equaling that of the width of the felly and tire of the vehicle wheel. As clearly illustrated in Figs. 3 and 4 of the drawings these lugs are constructed of a single sheet of metal, stamped in a shape to provide a substantial longitudinal portion, creased at its center and at vertical points from its sides equaling one half of the length and width of the body or central portion 5 of the sheet of metal. The lower crease from the central line of the sheet of metal is slit at B, and the sheet is provided with vertical and horizontal scores, while the upper portion of the sides may be cut at an angle toward each other. In forming the lug the rear portion forming the back or abutment face 4 and the sides 6 are bent upon the central longitudinal line C. The extension of the triangular sides 6ª are folded upwardly upon the lines D, and the triangular sides 6 are then folded inwardly over the base 5 which is accurate upon the line E, the triangular sides lying adjacent the edges of the base while the extensions 6ª extend entirely over the base 5 and have their ends meeting at the central portion of the base. Suitable perforations are provided within the base 5 and the side members 6ª. These members aline with each other and are adapted for the reception of retaining elements whereby the lugs are secured upon the segments 2 and 3.

The lugs provided upon the meeting ends of each of the segments 1 and 2 are of a construction similar to that just described, but have their triangular outer sides or meeting faces provided with slots or perforations adapted for the reception of suitable bolts 7 and securing elements 8. It will be noted by referring to Fig. 2 of the drawings that the securing elements 8 have one of their edges lying normally upon the arcuate base portion 5 of the retaining and bracing lugs, thus affording an efficient lock for the nut whereby displacement or movement of the nut is entirely prevented, it being understood that the nut is first positioned upon the base adjacent to the openings in the side of the lug and the bolt 7 is inserted through the openings of the lug and screwed into the nut.

In assembling my improved supplementary tire upon a vehicle wheel, one section of the tire is first positioned upon the wheel, the engaging and retaining lugs embracing each side of the felly of the wheel. The second section of the supplementary tire is likewise positioned upon the opposite portion of the wheel, and the bolts 7 are inserted within the perforations provided by the lugs at the extremities of the sections and engage with the nuts 8, thus forcing the sections toward each other and into tight engagement with the tire of the wheel, and the lugs into secure engagement upon the faces of the felly of the wheel.

It will be noted by reference to Figs. 1 and 2 of the arcuate drawing, that the base portions 5 of the lugs extend to the outer edges of the supplementary tire, and that by the construction of the lugs in the peculiar manner heretofore described, great strength is given to the tire, the arcuate base of the lugs and the triangular sides of the lugs remove strain from the outer edges of the supplementary tires, and the abutment face of the lug engaging with the felly of the wheel receives the strain and the strain thus received is resisted by the felly of the wheel. The lugs being arranged opposite each other, on each side of the felly of the wheel, strain on a lug upon one side of the supplementary tire and imparted to the felly is resisted by the opposite lug and a strong and thoroughly efficient supplementary tire is provided by this peculiar construction and arrangement of parts.

From the above description it will be noted that I have provided a strong and durable construction of vehicle wheels, one which is easily applied to or detached from an ordinary vehicle wheel, which provides a means for securely connecting the sections, and effectively retains the sections in locked position with each other, and which also provides for the ready separation of the sections of the tire when desired.

Having thus described the invention what is claimed as new is:

1. A supplementary tire for vehicle wheels, comprising a pair of segments having a series of retaining and bracing lugs having arcuate faces to correspond to the curvature of the segments and arranged in pairs and spaced opposite each other upon the inner faces of the segments and adapted to engage the faces of the felly of the wheel, the lugs at the meeting edges of the segments being provided with openings adapted for the reception of retaining elements, whereby the segments are detachably secured together.

2. A supplementary tire for vehicle wheels, comprising a pair of segments having a series of retaining and bracing lugs having arcuate faces to correspond with the curvature of the segments arranged in pairs spaced opposite each other upon the inner faces of the segments and adapted to engage each face of the felly of the wheel, the lugs comprising a felly abutment face, a base by which it is secured to the segments and triangular sides connecting the face and base portion, the lugs at the meeting edges of the segments having their sides provided with openings for the reception of a bolt adapted to engage with a nut, said nut having one of its edges normally lying upon the base portion of one of the retaining and bracing lugs.

3. In a supplementary tire for vehicles, a series of retaining and bracing lugs having arcuate faces to correspond with the curvature of the segments arranged upon the inner face of the tire in pairs spaced apart for the reception of the fellies of a wheel, said lugs comprising a felly engaging face, a base portion, secured to the supplementary tire and a pair of triangular sides connecting the face and the base portions of the lug, the base portion of the lug extending from the felly engaging face of the lug to the outer edges of the supplementary tire.

4. A lug for supplementary tires for vehicles, stamped from a sheet of metal, folded to present a back and a rounded base, the ends of the back and the rounded base folded to present sides and having their lower portions slit and adapted to lie upon the base.

5. A lug for supplementary tires for vehicles, comprising a sheet of metal provided with a rounded base and adapted to be folded longitudinally of its center and to be slit near its ends to the center, said slit portion adapted to be folded over the lower portion of the lug and to meet at the center of the lug, the portion of the metal above the slits adapted to be cut at an angle from the vertical line to the central longitudinal line of the lug and to form the sides of the lug.

In testimony whereof I affix my signature in presence of two witnesses.

JAMES T. CARITHERS.

Witnesses:
W. S. McCLELLAN,
REID CARITHERS.